April 23, 1968 P. F. CONE 3,378,920
METHOD FOR PRODUCING AN INTERCONNECTION MATRIX
Filed Jan. 26, 1966
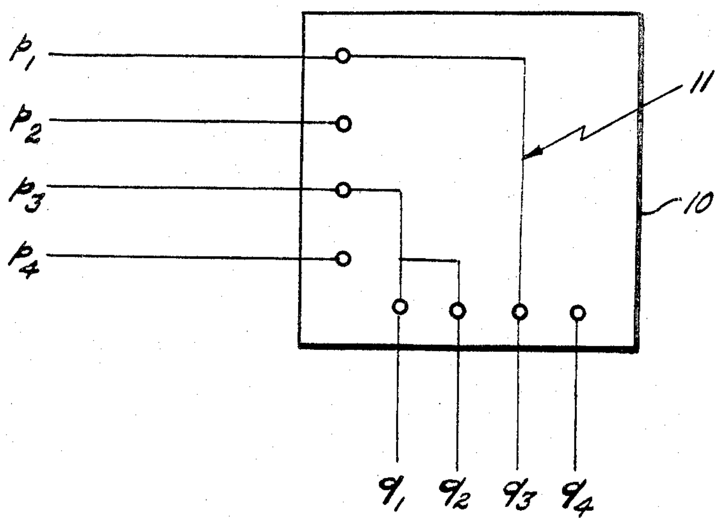
Fig. 1 PRIOR ART
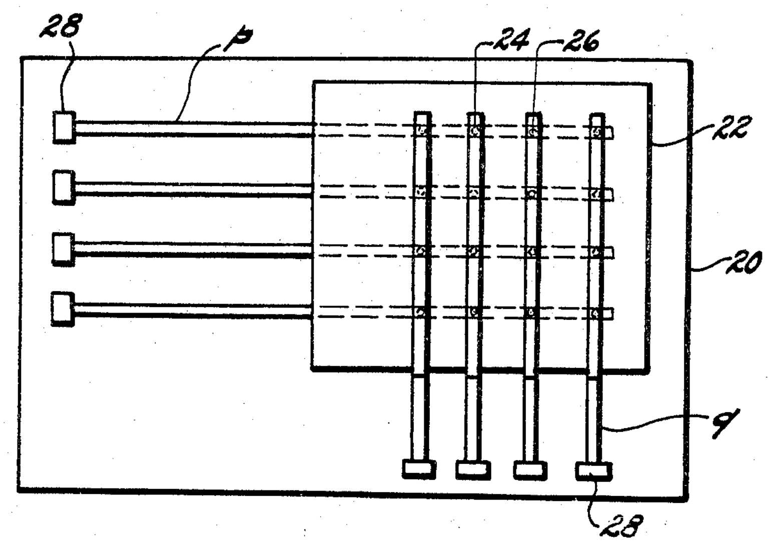
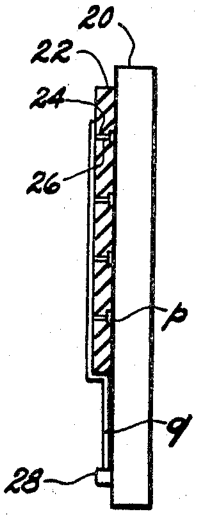
Fig. 2 Fig. 3
INVENTOR.
PETER F. CONE
BY Harry A. Herbert Jr. and Sherman H. Goldman
ATTORNEYS 3,378,920

METHOD FOR PRODUCING AN INTERCONNECTION MATRIX

Peter F. Cone, Bedford, Mass., assignor to the United States of America as represented by the Secretary of the Air Force Filed Jan. 26, 1966, Ser. No. 523,517
2 Claims. (Cl. 29—625)

ABSTRACT OF THE DISCLOSURE

A layered interconnection matrix board formed by printing a series of parallel conductors on a sheet of dielectric material, applying an insulating material over said sheet and portions of said conductors while leaving uncovered portions of said conductors, applying a fusible material at the uncovered portions, applying a second series of conductors at an angle to said first series of conductors to overlie the fusible material, and causing the fusible material to break down between conductors of each series at which no interconnection is desired.

This invention relates generally to electronic circuit interconnection matrixes and more particularly to a layered matrix board wherein all conductors are electrically connected and desired interconnection patterns are made by electrically eliminating undesired connections.

When a series of sets of conductors are orthogonally arranged, there is a mathematical limit to the number of connections for joining various pairs of wires from the sets of wires. Each intersection is a possible connection between the wires running in one direction to the wires in the orthogonally related direction.

Generally, interconnection between orthogonally related conductors has been performed by means of suitable connecting points around the edges of a board with the required interconnection pattern having been previously printed on board, for example, by printed circuit techniques. This method suffers from the disadvantage of not allowing all of the desired connections with one board. For example, the edge connection does not allow for a crossover of wires due to the co-planar relationship of the conductors, and change of the interconnection pattern is both lengthy and expensive.

The preformed interconnection matrix board of this invention has one set of parallel conductors formed on a base board and a second set of conducting lines at right angles to the first set of conductors with insulating material sandwiched therebetween. Suitable contact regions are formed at the ends of the conducting lines during the processing. The key to forming the interconnection between particular pairs of orthogonally related conductors is achieved by applying a fusible material between the conductors of each pair and electrically eliminating the fusible material between pairs where a connection is not desired.

Accordingly, it is a primary object of this invention to provide a method for producing a preformed interconnection board which by means of electrical break down of fusible material to eliminate undesired connections allows for any desired interconnection pattern between conductors.

It is another object of this invention to provide a method which enables a predetermined connection arrangement between generally orthogonally related conductors.

It is still another object of this invention to provide a method for producing an interconnection matrix wherein fusible material between layers of conductors is designed to have a break down rating which would allow for elimination of interconnections between superposed conductors which are not desired while not interfering with normal circuitry capacity.

It is a further object of this invention to provide a method for producing an interconnection matrix board which allows ofr easy change of the wiring pattern.

It is a still further object of this invention to provide a method of producing a printed wiring board which is capable of being programmed by a computer.

Another object of this invention involves a process for the production of electrical circuit assemblies which utilizes printed circuit techniques with conventional, currently available materials that lend themselves to standard mass production techniques.

These and other advantages, features and objects of the invention will become more apparent from the following description taken in connection with the illustrative embodiments in the accompanying drawings, wherein:

FIGURE 1 is a schematic representation of the prior art type of end connections;

FIGURE 2 is a schematic representation of the interconnection matrix board of this invention; and FIGURE 3 is an end view, partly in section, of the structure of FIGURE 2.

In the prior art a matrix of wires $p$ and $q$, which are orthogonally related and which lie in the same plane on the printing wiring boards 10, are interconnected by means of a printed circuit 11. Printed conductors interconnecting the conductors $p$ and $q$ around the edges of the interconnecting matrix board 10 are shown in FIGURE 1. There are $p \cdot q$ ways of joining a set of $p$ wires to a set of $q$ wires with a maximum of $(p+q-1)$ valid connections. With the board shown in FIGURE 1, wire $p_2$ can not be connected with wire $q_4$. This difficulty is overcome by means of the arrangement of this invention illustrated in FIGURE 2 and also by the structure described in my copending application Serial No. 523,515, filed on even date herewith and titled "Interconnection Matrix;" however, the instant invention provides for a lower intercapacity with greater reliability.

The matrix in FIGURE 2 comprises a substrate 20 which may be made of almost any conventional material utilized in circuit boards, e.g., Teflon, glass, ceramics, or epoxy board. A first layer of $p$ wires is either deposited chemically or vacuum deposited onto the substrate or bonded thereto, and then etched into lines using standard, printed circuit techniques. The material used for the conductors most commonly would be copper or aluminum.

The second layer, overlying the $p$ wires and the substrate, comprises an insulating layer 22 of glass, alumina or a silicon oxide deposited by bonding, chemically or by vacuum evaporation. This layer, if vacuum deposited, is applied with a mask in order to allow for holes 24 therethrough. When bonding is utilized as the fabrication method, the holes would be preformed in the insulating material 22.

Within the bores 24, which occur at the desired junction between orthogonally related conductors, a fusible material 26, conventionally used in the fuse art, which would have a rating or capacity greater than that required for the circuit board, would provide a connection with the conductor $p$.

The third layer applied to the board 20 comprises a set of $q$ wires which are orthogonally related to the previously deposited set of $p$ wires. The manner of application and the materials utilized in this last layer would be the same as that described with respect to the $p$ wires. The orthogonal relationship is not a requirement; however, for computer programming of the desired connection, the orthogonal relationship is admirably suited.

At this stage there are four layers forming the matrix board comprising the substrate 20, the set of $p$ wires, the insulation and the $q$ wires. All lines are connected with each other by means of fusible material 26 and suitable contact regions, illustrated generally at 28, are provided for both the *p* and *q* conductors.

In order to create the desired interconnection pattern, the undesired connections would have electrical power applied to the wires thereof and a high current passed through the circuit in order to "blow" the fuse element 26.

Thus, there has been described a preformed interconnection board which allows for any possible connection arrangement between conductors and also which allows for ready change of wiring patterns. The resultant structure is exceptionally reliable and has a very low intercapacity.

Although the invention has been described with reference to a particular embodiment, it will be understood to those skilled in the art that the invention is capable of a variety of alternative embodiments within the spirit and scope of the appended claims.

I claim:

1. A method for producing an interconnection matrix board having any desired interconnection pattern between crossed series of conductors comprising the sequential step of, applying a series of generally parallel conductors on a matrix board by a printed circuit technique, applying an insulating layer over a portion of said conductors while leaving holes in said layer exposing portions of said conductors.

applying a conductive fusible material having a breakdown rating which would be greater than the circuit capacity of the matrix board and less than the breakdown rating of any conductors applied to the board on said conductors in the holes and filling the same, applying a second series of generally parallel conductors on said matrix board, the conductors of said second series of conductors crossing the conductors of said first-mentioned series of conductors at the holes in said insulating layer with said fusible material forming interconnections between conductors of said series of conductors, and causing said fusible material to break down between conductors of each series which are not to be interconnected.

2. A method as defined in claim 1 wherein said causing of said fusible material to break down is performed by applying a high current through conductors for which no interconnection is desired.

References Cited

UNITED STATES PATENTS

| | | |
|---|---|---|
| 2,399,753 | 5/1946 | McLarn. |
| 3,028,659 | 4/1962 | Chow et al. |
| 3,226,802 | 1/1966 | Goodwin et al. |

DARRELL L. CLAY, *Primary Examiner.*